United States Patent
Bruns et al.

(10) Patent No.: US 8,186,703 B2
(45) Date of Patent: May 29, 2012

(54) TOW CABLE KIT

(75) Inventors: Nicholas David Bruns, Cedar Falls, IA (US); Shane Michael Boden, Waverly, IA (US)

(73) Assignee: Deere & Company, Moline, IL (US)

( * ) Notice: Subject to any disclaimer, the term of this patent is extended or adjusted under 35 U.S.C. 154(b) by 788 days.

(21) Appl. No.: 11/770,156

(22) Filed: Jun. 28, 2007

(65) Prior Publication Data

US 2009/0001688 A1 Jan. 1, 2009

(51) Int. Cl.
*B60D 1/18* (2006.01)

(52) U.S. Cl. ............... 280/416.1; 280/480.1; 280/515

(58) Field of Classification Search ........... 280/415.1, 280/416.1, 416.2, 416.3, 515, 514, 504, 480, 280/480.1; 411/517, 508
See application file for complete search history.

(56) References Cited

U.S. PATENT DOCUMENTS

| | | | | |
|---|---|---|---|---|
| 2,705,157 | A | * | 3/1955 | Dail .............................. 280/515 |
| 3,269,109 | A | * | 8/1966 | Hart ................................ 59/86 |
| 3,471,171 | A | * | 10/1969 | Polzin et al. .................. 280/497 |
| 3,843,160 | A | * | 10/1974 | Frushour et al. ........... 280/416.1 |
| 4,317,580 | A | * | 3/1982 | Scarnato et al. ........... 280/415.1 |
| 5,193,625 | A | * | 3/1993 | Goll .............................. 172/248 |
| 5,769,559 | A | * | 6/1998 | Olson ........................ 403/322.1 |
| 7,264,064 | B2 | * | 9/2007 | Ehrhart et al. ................ 172/449 |
| 2002/0069681 | A1 | * | 6/2002 | Golden et al. .................... 70/34 |
| 2008/0067785 | A1 | * | 3/2008 | Buerkle et al. ................ 280/515 |

OTHER PUBLICATIONS

Deere & Company; Tow Cable Kit; 11 pages; 2006.
Deere & Company; Old Tow Cable Kit; and Current Tow Cable Kit; 1 page; date known.
Caterpillar; Challenger Competitive Tow Cable; date unknown.
Case NH; Case NH Tow Cable; date unknown.

* cited by examiner

*Primary Examiner* — Anne Marie M. Boehler

(57) ABSTRACT

A tow cable kit is mounted to a pin support member which is attached to a frame of the vehicle. The pin support member includes an upper plate and a lower plate. Each plate has a front bore and a rear bore. The front bores receive a front towing pin, and the rear bores receive a rear towing pin. The front towing pin is received by a towing cable, the rear towing pin is received by a drawbar. The tow cable kit includes a floater plate which is spaced apart from the pin support member and is coupled to both towing pins. The floater plate has a pair of spaced apart bores for receiving the towing pins and for protecting snap rings which are mounted on the towing pins.

4 Claims, 2 Drawing Sheets

TOW CABLE KIT

FIELD OF THE INVENTION

The present invention relates to a tow cable kit for a vehicle.

BACKGROUND OF THE INVENTION

It is known to install tow cable kits on vehicles so that the vehicle can be towed. For example, John Deere provides a "hammer strap" type tow cable kit which is mounted by drilling holes into the drawbar. The hammer strap design changes the stiffness of the drawbar which affects the ability of the Autoload system to sense load. Also, many vehicles have a tow cable kit installed at the dealership. For some vehicles, the tow cable is connected to the front of the chassis. High towing forces are thus transmitted through the vehicle frame, which must be reinforced to handle this load. For example, certain vehicles have a large ring which is attached to a large structure, which is fixed to the frame.

SUMMARY OF THE INVENTION

Accordingly, an object of this invention is to provide a vehicle tow cable kit which does not adversely effect functioning of an Autoload system.

A further object of the invention is to provide such a tow cable kit which is easy to service.

A further object of the invention is to provide such a tow cable kit which does not require a large structure or a reinforced frame.

These and other objects are achieved by the present invention, wherein a tow cable kit is mounted to a pin support member which is attached to a frame of the vehicle. The pin support member includes an upper plate and a lower plate. Each plate has a front bore and a rear bore. The front bores receive a front towing pin, and the rear bores receive a rear towing pin. The front towing pin is received by a towing cable, the rear towing pin is received by a drawbar. A The tow cable kit includes a floater plate which is spaced apart from the pin support member and is coupled to both towing pins. The floater plate has a pair of spaced apart bores for receiving the towing pins and for protecting snap rings which are mounted on the towing pins.

DESCRIPTION OF THE PREFERRED EMBODIMENT

Figure 1:
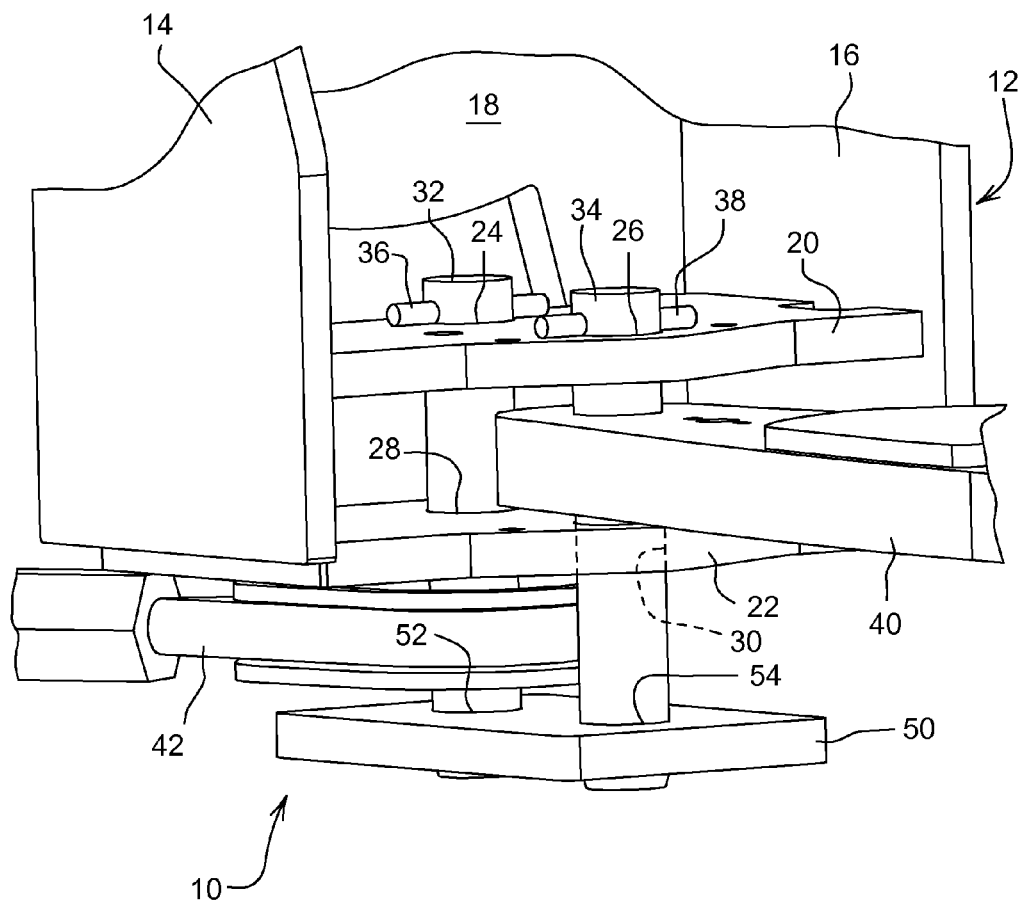
FIG. 1 is a rear perspective view of a tow cable kit embodying the invention.

Referring to FIG. 1, the tow cable kit 10 is mounted to a frame structure 12 which is attached to a frame of a vehicle. Frame structure 12 includes a pair of side plates 14 and 16 connected to a front plate 18. Horizontal upper and lower support plates 20 and 22 extend between the side plates 14 and 16 and are fixed to a side of the front plate 18. Upper support plate 20 includes a front bore 24 and a rear bore 26. Lower support plate 22 includes a front bore 28 and a rear bore 30. Front bores 24 and 28 are aligned and receive a front pin 32. Rear bores 26 and 30 are aligned and receive a rear pin 34. Cross pins 36 and 38 are inserted through the upper ends of pins 32 and 34 to prevent their falling down through the plates 20 and 22. Rear pin 34 may be received by and coupled to a front end of a drawbar 40. Front pin 32 is adapted to be received by and coupled to a loop of a tow cable 42.

Figure 2:
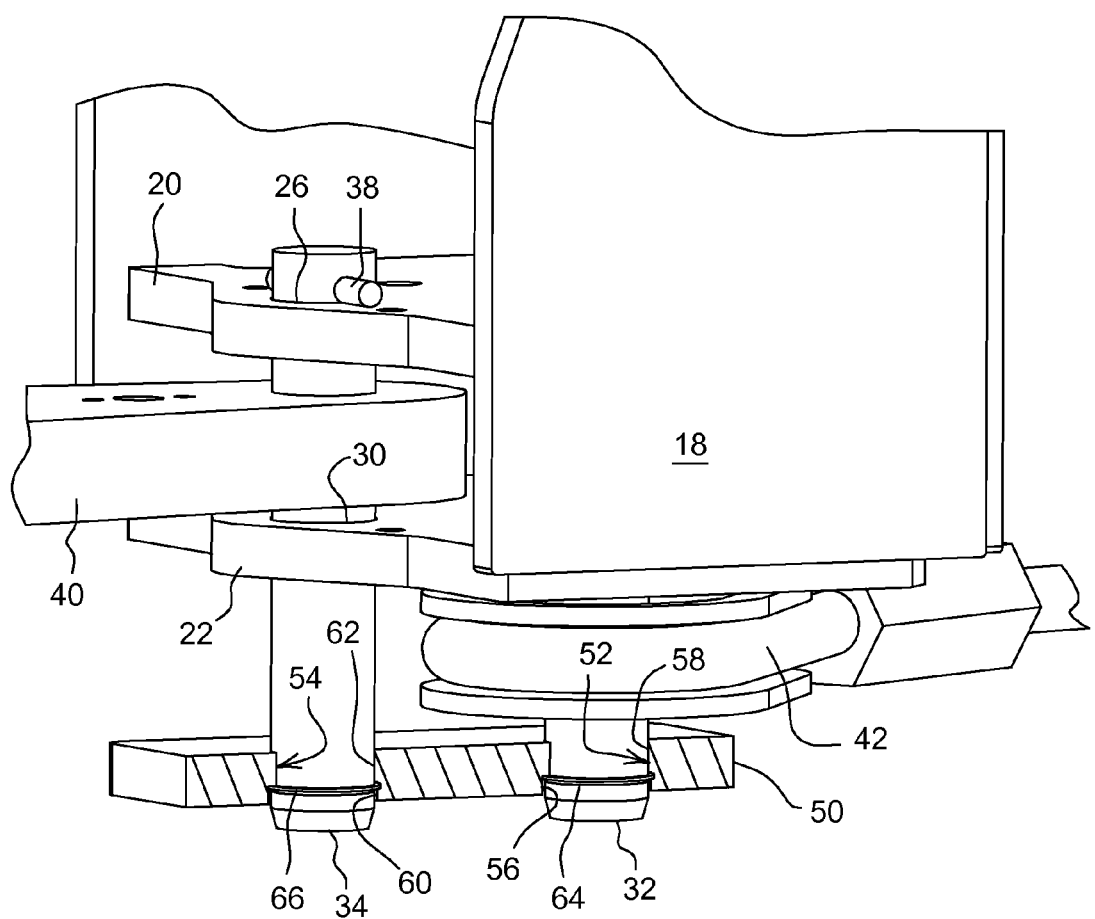
FIG. 2 is a partially sectional perspective view of the tow cable kit of FIG. 1.

The tow cable kit 10 includes a floater plate 50 which receives the lower ends of pins 32 and 34. As best seen in FIG. 2, floater plate 50 has a front bore 52 and a rear bore 54. Front bore 52 includes a lower larger diameter portion 56 and an upper smaller diameter portion 58. Rear bore 54 includes a lower larger diameter portion 60 and an upper smaller diameter portion 62. A snap ring 64 is mounted in a groove (not shown) in a lower end of pin 32 and is received in the lower larger diameter portion 56 of bore 52. A snap ring 66 is mounted in a groove (not shown) in a lower end of pin 34 and is received in the lower larger diameter portion 60 of bore 54.

With two pins 32 and 34 coupled together by floater plate 50, high loads applied to the tow cable 42 will be shared and transmitted through both pins 32 and 34. The snap rings 64 and 66 are enclosed in bores and protected by the body of the floater plate 50. This ensures that the pins do not slip or unwind, and that they will not be removed by debris. The pins can float and can thereby move up when contacting large rocks or heavy earth, minimizing failures. This design requires no modifications be made to standard drawbar support or frame parts.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle drawbar support assembly comprising:
a pin support member for attaching to a frame of a vehicle, the pin support member supporting a cable pin and a drawbar pin, both pins being mounted in bores in the pin support member, the cable pin being forward of the drawbar pin and being adapted to be received by a towing cable, the drawbar pin being adapted to be received by a bore in a front end of the drawbar;
a floater plate spaced apart from the pin support member and coupled to the pins, the floater plate having a pair of spaced apart bores for receiving the pins, each bore in the floater plate includes a lower larger diameter portion and an upper smaller diameter portion; and
a snap ring is mounted on each pin and is received in a corresponding one of the larger diameter portions.

2. The tow cable kit of claim 1, wherein:
the pin support member comprises an upper plate and a lower plate, the upper plate having a front bore and a rear bore, the lower plate having a front bore and a rear bore, the front bores receiving the cable pin, and the rear bores receiving the drawbar pin.

3. A vehicle drawbar support assembly comprising:
a pin support member for attaching to a frame of the vehicle, the pin support member comprising an upper plate and a lower plate, the upper plate having a front bore and a rear bore, the lower plate having a front bore and a rear bore, the drawbar support assembly supporting a cable pin received by the front bores, the cable pin being adapted to be received by a forwardly extending towing cable, and a drawbar pin received by the rear bores, the drawbar pin being adapted to be coupled to a front end of a drawbar;
a floater plate spaced apart from the lower plate and movable with respect to the lower plate, the floater plate being coupled to the pins, the floater plate having a pair of spaced apart bores for receiving the pins, each bore in the floater plate including a lower larger diameter portion and an upper smaller diameter portion; and a snap ring mounted on each pin and received in a corresponding one of the larger diameter portions.

4. A vehicle drawbar support assembly comprising:

an upper plate and a lower plate, both attached to a frame of the vehicle, the upper plate having a front bore and a rear bore, the lower plate having a front bore and a rear bore, the drawbar support assembly supporting a front pin and a rear pin, the front pin being received by the front bores, and the rear pin being received by the rear bores, the front pin being adapted to be received by a towing cable, the rear pin being adapted to be coupled to a front end of a drawbar;

a floater plate spaced apart from and movable with respect to the lower plate and coupled to the pins, the floater plate having a pair of spaced apart bores for receiving the pins; and a snap ring mounted on each pin and received in a corresponding one of the floater plate bores.

\* \* \* \* \*